United States Patent Office 2,889,178
Patented June 2, 1959

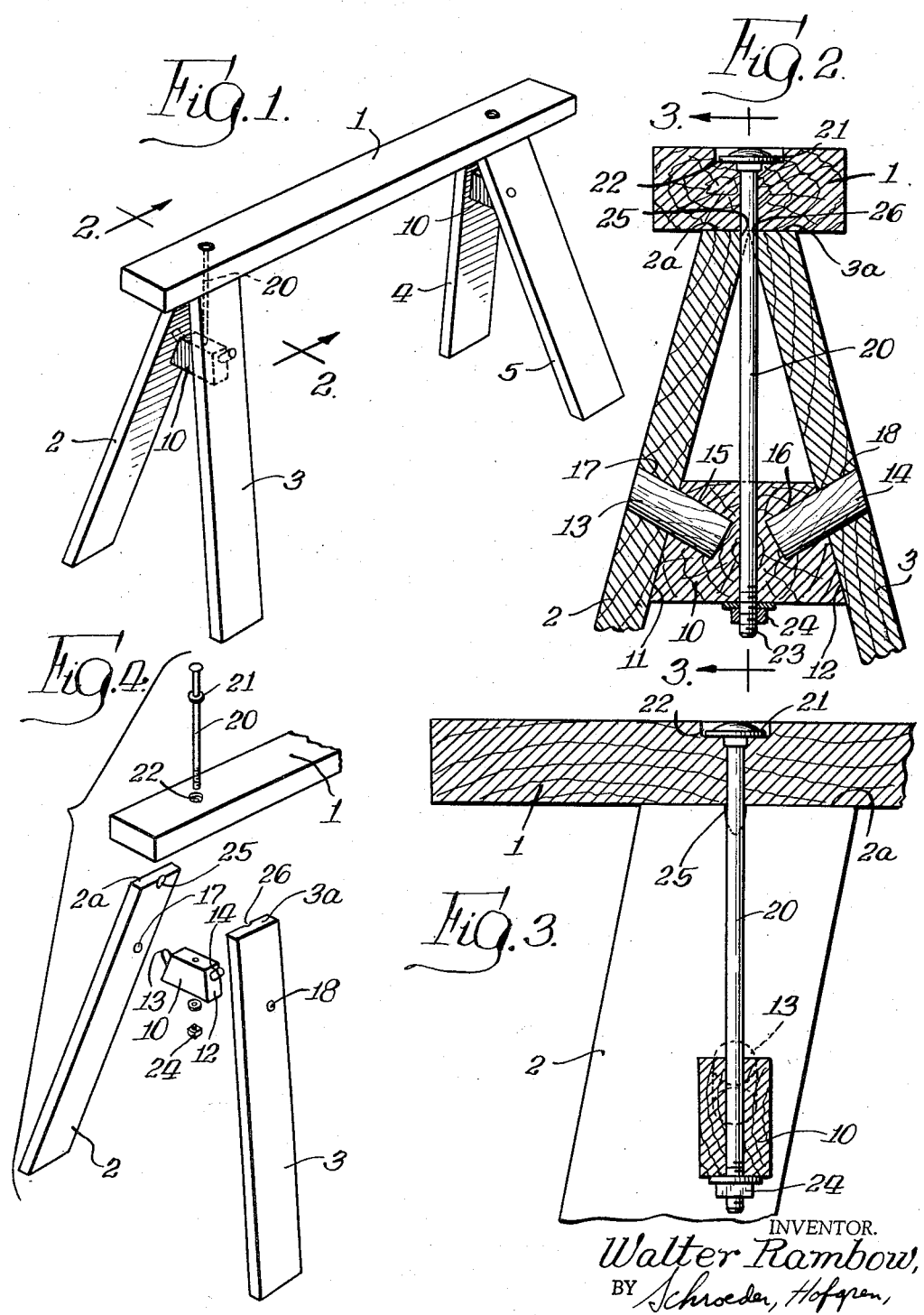

2,889,178

LEG SUPPORTED STRUCTURE

Walter Rambow, Chicago, Ill.

Application October 14, 1957, Serial No. 690,036

5 Claims. (Cl. 304—5)

This invention relates to a leg supported structure and more particularly to a saw horse or the like.

An object of this invention is to provide a new and improved leg supported structure.

Another object of the invention is to provide a saw horse or the like made of relatively simple and inexpensive standard parts which may be easily assembled into a sturdy rigid structure and which may be easily disassembled, if desired.

Another object of the invention is to provide a saw horse or the like having an elongated crossbar with a pair of legs adjacent each end thereof, the legs of each pair being oppositely inclined and having a brace block therebetween, coacting means on the brace block and adjacent legs for drawing the legs tightly against the brace block and crossbar underside when the block is drawn toward the crossbar, and means for drawing the block toward the crossbar.

Further objects and advantages will become apparent from the following detailed description taken in connection with the accompanying drawings in which:

Fig. 1 is a perspective view in elevation of the saw horse or the like;

Fig. 2 is a vertical fragmentary section on an enlarged scale taken through a pair of legs and the block therebetween and generally along the line 2—2 in Fig. 1;

Fig. 3 is a vertical fragmentary section taken generally along the line 3—3 in Fig. 2; and Fig. 4 is a fragmentary exploded perspective view of one end of the saw horse or the like.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

The saw horse or the like comprises an elongated crossbar 1 having a pair of legs 2, 3 adjacent one end thereof and a second pair of legs 4, 5 adjacent the other end thereof. Each of the legs has its top and bottom faces sloped so that when the legs 2, 3, 4, and 5 are assembled with the crossbar 1, the legs of each pair are oppositely inclined toward each other and the pairs of legs are inclined oppositely to each other with the top faces of the legs flush with the underside of the crossbar 1 and the bottom faces flush with a supporting surface. The opposite inclination of the legs in a pair and the pairs of legs relative to each other provides a wide spread of the leg bases to form a sturdy base structure for the saw horse. The top faces for the legs 2 and 3 are shown at 2a and 3a. Each pair of legs has similar mechanism associated therewith for securely fastening the legs to the crossbar 1 and these structures are similar. The structure associated with legs 2 and 3 will be hereinafter described.

A brace block 10 fits between the legs 2 and 3 a short distance beneath the crossbar 1 and has a pair of inclined faces 11 and 12 which engage an adjacent area of the legs 2 and 3. A dowel 13 extends outwardly from face 11 of the block 10 and a similar dowel 14 extends outwardly from the block face 12. These dowels 13 and 14 are shown as cylindrically shaped inserts fitted in openings 15 and 16 in the block 10 although the dowels 13 and 14 could be formed integrally with the block 10 and could have shapes other than cylindrical.

The dowels 13 and 14 fit in correspondingly shaped openings 17 and 18 in the legs 2 and 3 respectively. The dowels 13 and 14 are upwardly inclined toward the crossbar 1 and at an angle to the block faces 11 and 12 as are the coacting openings 17 and 18 in the legs. As the block 10 is drawn toward the crossbar 1 the dowels 13 and 14 function to draw the top faces 2a and 3a of the legs 2 and 3, respectively, against the underside of the crossbar 1 and because of their inclination to tightly draw the legs 2 and 3 against the block faces 11 and 12.

Means are provided for drawing the block 10 towards the crossbar 1 and tightly assembling the parts together. This means comprises a bolt 20 at one end engageable with a washer 21 fitted in a depression 22 in the top of the crossbar 1. The bolt 20 has threads 23 at its other end and a nut 24 is threadably mounted thereon beneath the brace block 10. Tightening of the nut 24 will result in drawing the leg structure tightly against the crossbar 1 and assembly of both pairs of legs will result in a rigid saw horse structure. The parts may be easily disassembled by removing the nut 24 and withdrawing the bolt from the brace block 10. Each of the legs adjacent its upper face is formed with a slight recess to provide clearance for the bolt 20 as shown at 25 and 26 on legs 2 and 3.

The disclosed saw horse or the like utilizes standard easily available parts which anyone may easily assemble into a rigid structure with a minimum of effort.

I claim:

1. A leg supported structure comprising an elongated crossbar, a pair of oppositely inclined legs adjacent each end of the crossbar for supporting the crossbar, a brace block between the legs of each pair having a pair of inclined faces engageable each with an adjacent leg area, a pair of cylindrical dowels associated with each block and extending one from each of said faces and inclined upwardly toward the crossbar at an angle to said faces, a correspondingly shaped and inclined opening in each of said legs for receiving the dowels, and means for drawing the block toward the crossbar and as a result drawing the legs against the crossbar underside and the block faces including a bolt and nut assembly connected between the bar and block.

2. A saw horse comprising a crossbar, a pair of oppositely inclined legs adjacent each end of the crossbar for supporting the crossbar, a brace block between the legs of each pair having a pair of inclined faces engageable with adjacent leg areas, a pair of dowels associated with each block and extending one from each of said faces and inclined upwardly toward the crossbar, a correspondingly shaped and inclined opening in each of said legs for receiving the dowel, and means for drawing the block toward the crossbar and as a result drawing the legs against the crossbar underside and the block faces.

3. A saw horse construction comprising, an elongated crossbar, a pair of downwardly and outwardly inclined legs adjacent each end of the crossbar, means associated with each pair of legs for securely fastening said legs to the crossbar comprising, a brace block between and in contact with the legs at a distance from the crossbar, a bolt and nut assembly extending between the brace block and the crossbar for drawing said block and bar toward each other, and a pair of cylindrical dowels extending outwardly from the block and inclined upwardly toward the crossbar and fitted in correspondingly shaped openings in said legs whereby as the block is drawn toward the bar the legs are drawn against the block and the underside of the crossbar.

4. A leg supported structure comprising a crossbar, a pair of oppositely inclined legs adjacent an end of the crossbar for aiding in support of the crossbar, a brace block between the legs having a pair of inclined faces engageable with adjacent leg areas, a pair of dowels associated with the block and extending one from each of said faces and inclined upwardly toward the crossbar, a correspondingly shaped and inclined opening in each of said legs for receiving the dowels, and means for drawing the block toward the crossbar and to draw the legs against the crossbar underside and the block faces.

5. A saw horse or the like comprising, a crossbar, a pair of legs engaging the underside of the crossbar adjacent each end thereof with the legs of each pair being oppositely inclined, a brace block engageable with the legs of each pair, coacting means including dowels and openings therefor on the block and adjacent legs to draw the legs toward the crossbar and block as the block is drawn toward the crossbar, and means for drawing the block toward the crossbar.

References Cited in the file of this patent

UNITED STATES PATENTS

| | | |
|---|---|---|
| 2,132,285 | Brown | Oct. 4, 1939 |
| 2,664,319 | Doucette | Dec. 29, 1953 |

FOREIGN PATENTS

| | | |
|---|---|---|
| 929,833 | France | July 22, 1947 |
| 166,057 | Australia | Sept. 2, 1954 |